Oct. 21, 1969
J. E. MARTIN ET AL
3,473,555
FLUID FLOW PRECLUDING TOOL
Filed Aug. 15, 1967
2 Sheets-Sheet 1
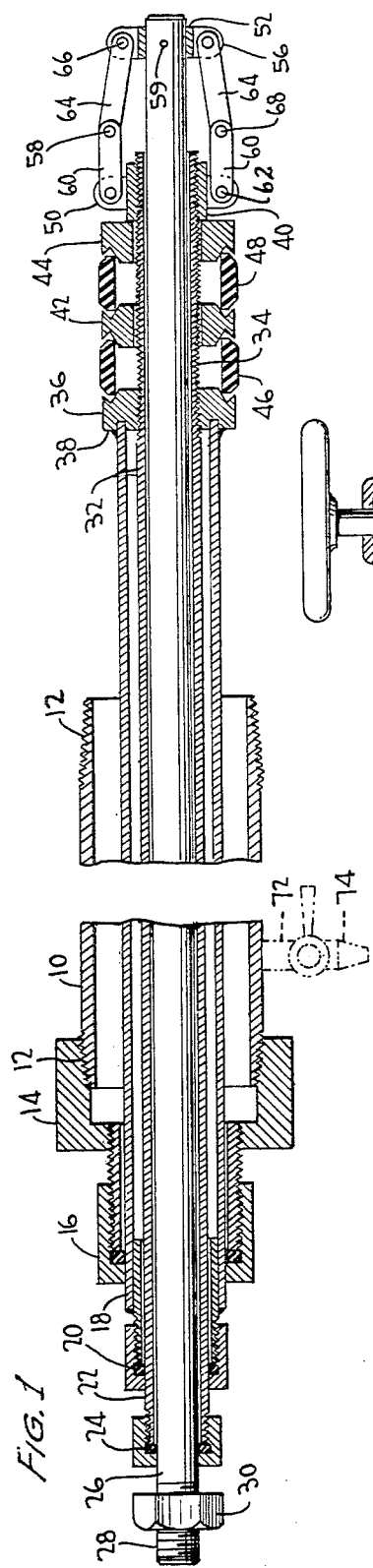
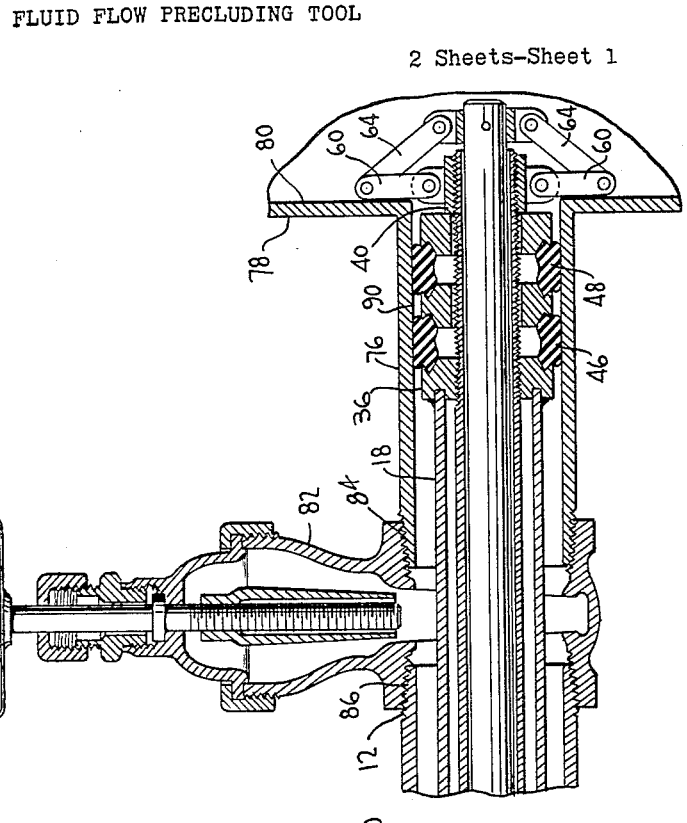
INVENTORS,
JOHN E. MARTIN
JULIAN G. CZECK
BY Jacobi & Davidson
ATTORNEYS

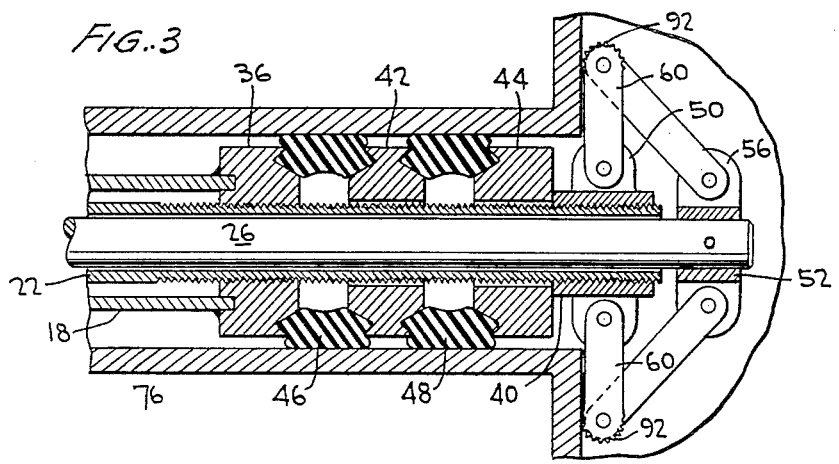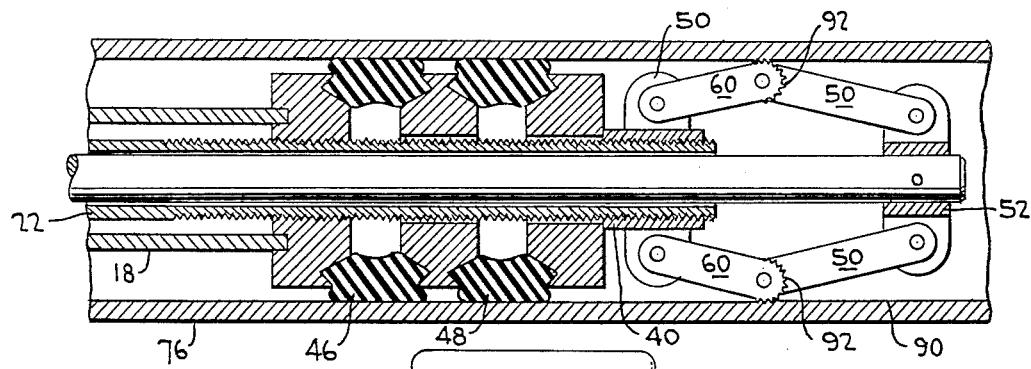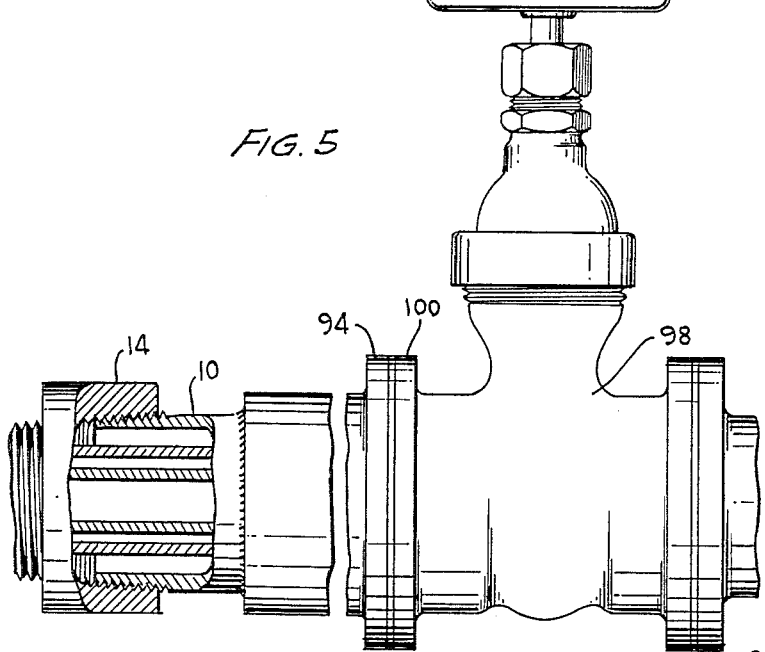

United States Patent Office 3,473,555
Patented Oct. 21, 1969

1

3,473,555
FLUID FLOW PRECLUDING TOOL
John E. Martin, Spring House, and Julian G. Czeck, Norristown, Pa., assignors to Expando Seal Tool, Inc., Spring House, Pa., a corporation of Pennsylvania
Filed Aug. 15, 1967, Ser. No. 660,711
Int. Cl. F16k 43/00, 51/00; F16l 55/18
U.S. Cl. 137—315                                      10 Claims

ABSTRACT OF THE DISCLOSURE

A tool, which is provided with an unexpanded fluid flow precluding portion, that is adapted to be connected to a fluid conduit means including a valve or similar device, which requires removal or repair, while the fluid conduit means still contains fluid under high pressure; the tool is provided with a positive locking arrangement that prevents dislodgement from such conduit means by such high pressure conditions which may be encountered during use; the tool includes a fluid tight housing which is attached to the downstream side of the closed valve, the valve is then opened and the flow precluding portion extended therethrough into the conduit connected to the upstream side of the valve and positively locked therein; the flow precluding portion is then expanded into sealing engagement with the internal wall of an upstream conduit; the valve is then removed from an upstream conduit and repaired or replaced; the tool is then removed.

BACKGROUND OF THE INVENTION

The present invention relates to a tool and more particularly to a tool for blocking or precluding flow of fluid through a conduit means or from a tank or similar pressure fluid containing vessel.

While tools for preventing fluid flow through conduits are not unknown, such tools, as have been commercially available, have not been satisfactory since when subjected to high fluid pressure conditions, they were blown from the conduit in which they were required to block flow.

Such unreliability of previous flow precluding tools produced serious hazardous conditions. For example, if such a device was installed in an oil pipe line and blown out, oil would be spread over wide areas. Such oil might readily be ignited and result in widespread fires. Similarly, if such a device were installed in an inflammable gas line or in a system for conveying explosive chemicals, and failed, a serious explosion might result.

Taking into consideration the foregoing deficiencies, it is the primary object of the present invention to provide a flow precluding tool that is reliable in operation.

Another object of the invention is to provide a flow precluding tool that includes a plurality of normally unexpanded expandable elements that are adapted to be inserted in a fluid flow conduit means to effectively block or preclude flow therethrough.

Yet, another object of the invention is to provide a fluid flow precluding tool that may be inserted in a fluid flow conduit means and positively locked in position therein.

Still another object of the invention is to provide a fluid flow precluding tool that not only precludes fluid flow through a conduit means into which it is inserted, but will also be positively locked in position therein.

A further object of the invention is to provide a fluid flow precluding tool which may be inserted into a fluid flow conduit means to preclude fluid flow therethrough and which is provided with a novel means for positively locking said flow precluding means in position therein.

A still further object of the invention is to provide a novel means for positively locking a device in a conduit

2 means which comprises a plurality of pairs of pivotally interconnected link members having the free ends of each pair pivotally connected to longitudinally, relatively movable members which effect the collapse or extension of each pair of interconnected link members.

Yet, another object of the present invention is to provide a further novel means for positively locking a device in a conduit means which comprises a plurality of pairs of interconnected link members, in which at least one of the interconnected ends of each pair of interconnected link members is provided with teeth that are adapted to engage the walls of a conduit and the other ends of each pair of link members are pivotally connected to longitudinally relatively movable members that effect the collapse or expansion of each pair of interconnected link members.

A more specific object of the invention is to provide a tool having an expandable flow precluding portion that is useful in the replacing or repair of a valve in a fluid flow pipe line, while pressure remains in the pipe line, by attaching such tool while the valve is closed, advancing the flow precluding portion thereof through the opened valve, locking said flow precluding portion in position within the conduit upstream of the valve, then expanding said expandable flow precluding portion into sealing engagement with the wall of conduit upstream of said valve and then removing said valve.

An additional object of the invention is to provide a fluid flow precluding device according to the teachings of the present invention which is simple in construction, durable and made of materials of relatively low cost.

The invention will be better understood and objects other than those set forth above will become apparent, after reading the following detailed description thereof. Such description refers to the annexed drawings presenting preferred and illustrative embodiments of the invention.

In the drawings:

FIGURE 1 is a longitudinal section through the flow precluding tool, according to the present invention, showing the tool locking means in collapsed condition;

FIGURE 2 is a sectional view of the flow precluding tool extended through a valve and showing the tool positively locked to an enlarged fluid flow conduit means or container;

FIGURE 3 is a partially enlarged sectional view showing the tool positioned as in FIGURE 2 but also showing conduit wall engaging teeth on the link members of the positive holding means;

FIGURE 4 is an enlarged view similar to FIGURE 3, but showing the teeth of the positive holding means in engagement with the interior wall of a conduit means;

FIGURE 5 is an elevational view showing a flow precluding and positive locking means provided with a flange for connection to a valve of the type provided with a flange.

DESCRIPTION OF THE PREFERRED EMBODIMENT

Referring to the drawings, it is to be noted that the device disclosed therein includes a housing member 10 having threaded ends 12, 12. An assembly tube 14 is threadably or otherwise secured to housing 10 and is provided at its other end with a seal construction 16 which receives therethrough, in fluid tight relation, a first end of a compression tube 18. Compression tube 18 at its first end is provided with a seal construction 20 which receives therethrough, in fluid tight relation, the first end of a backing tube 22. Backing tube 22 at its first end is provided with a seal construction 24 which receives therethrough, in fluid tight relation, the first end of a lock rod 26. Lock rod 26 is threaded at its first end at 28 and on the threads 28 is mounted an adjustable lock nut 30.

The second end 32 of backing tube 22 is provided with threads 34 and it extends beyond the housing member 10. An annular compression member 36 is threadably mounted on backing tube 22 and is fixedly secured to compression tube 18 by any conventional means, such as welding at 38.

A first support ring 40 is mounted by means of threads on backing member 22 in spaced relation to annular compression member 36.

A pair of rigid annular compression rings 42 and 44 are loosely mounted on the backing tube 22 between the annular compression member 36 and first support ring 40. A first deformable ring 46 of neoprene or similar material, is mounted on backing tube 22 between the annular compression member 36 and rigid annular compression ring 42. A second deformable ring 48 of neoprene is mounted on backing tube 22 between rigid annular compression ring 42 and rigid annular compression ring 44. Support ring 40 is provided on its exterior with a plurality of circumferentially spaced outwardly directed flange members 50. A second support ring 52 is fixedly mounted on the second end of lock rod 26 by means of a pin 54. Second support ring 52 is provided on its exterior with a plurality of circumferentially spaced outwardly directed flange members 56. A plurality of pairs of link means 58, each comprising a first link member 60 pivotally connected by a pivot pin 62 to an associated flange member 50, and a second link member 64, pivotally connected by a pivot pin 66 to an associated flange member 56, are pivotally interconnected by a pivot pin 68.

In FIGURE 2, the flow precluding tool is disclosed as locked in position with respect to an upstream conduit means 76 that is adapted to receive a fluid under pressure from an enlarged conduit means or container 78 having a laterally extending internal wall surface 80. The end of conduit means 76 is provided with screw threads onto which a valve 82 having a threaded inlet 84 is secured. Valve 82 also has a threaded outlet 86 which receives the threaded end 14 of housing member 10. In FIGURE 2, lock rod 26 is shown as withdrawn in a direction toward housing member 10 causing first link members 60 to extend outwardly at right angles to the longitudinal axis of conduit means 76 and in engagement with wall surface 80. The link members 60 are held positively locked in this position by a sleeve means 88 secured between lock nut 30 and the end of backing tube 22. This figure also shows compression tube 18 and annular compression member 36 adjusted relative to first support ring 40 so as to deform the deformable rings 46 and 48 into flow precluding sealing engagement with the internal wall 90 of upstream conduit means 76.

FIGURES 3 and 4 show a modification of the tool illustrated in FIGURES 1 and 2. In this form of the invention, the interconnecting ends of links 60 are provided with teeth 92 that are adapted to bite into the internal surface 90 of conduit means 76 and contribute to the positive locking of the tool within conduit means 76 in the same manner that link members 60 contribute to the positive locking of the tool in the conduit means.

FIGURE 5 illustrates a modification of the arrangement shown in FIGURES 1 to 4. The only difference being that the housing of the tool 10, instead of being provided with a screw threaded end 14, is provided with a laterally extending flange 94 which is designed to cooperate with a valve 98 having a laterally extending flange 100.

When it is desired to repair or replace a valve such as shown in FIGURE 2, valve 82 is first closed. With valve 82 closed, the downstream conduit means (not illustrated) is removed. Seal construction 16 is loosened sufficiently so that the portions of the tool extending beyond the threaded end 14 of housing 10 are withdrawn into housing 10. Housing 10, by means of threads 14 is then secured to the threads 86 of valve 82. Valve 82 is again opened and compression tube 18, backing tube 22 and collapsed link member 58 are pushed through the loosened seal construction 16 until first support ring 40 is positioned beyond wall surface 80. Its desired position, it should be noted, can be determined by prior measurement. Lock rod 26 is then withdrawn through gland 24, expanding the linkage means 58, until the link members 60 abut against wall surafce 80. Lock sleeve 88 is then positioned on lock rod 26 and lock nut 30 tightened snugly against lock sleeve 88. The tool is now positively locked with the deformable flow precluding rings positioned in the conduit means 76 upstream of valve 82. All glands are tightened at this time to prevent leakage of fluid from the tool. Spanner wrenches are applied to the backing tube 22 and compression tube 18 and manipulated to move annular compression member 36 relative to first support ring 40 so as to deform neoprene rings 46 and 48 into sealing flow precluding engagement with the internal wall 90 of conduit means 76 and thus prevent flow of fluid to the valve 82. The assembly is then drained through drain tube 72 and drain valve 74. Assembly tube 14 is now removed with compression tube 18 and backing tube 22 still positively locked with the neoprene rings in sealing engagement with the wall of the conduit means 76. Valve 82 is now replaced or repaired. Assembly tube 14 is again attached to the valve 82 and sleeve means 88 removed. Spanner wrenches are again applied to backing tube 22 and compression tube 18 to relieve the deforming force applied to the neoprene rings 46, 48. Lock rod 26 is pushed through seal construction 16 until link means 58 are aganist extended. Lock rod 26 and neoprene rings 46, 48 are now withdrawn through the valve 82 and assembly tube 14. Valve 82 is closed. Assembly tube 14 and all basic tool parts are now disconnected from valve 82. The fluid conduit means downstream of the valve 82 is now replaced and valve 82 reopened. The fluid handling system is thereby restored to operative condition.

After reading the foregoing detailed description, it will be apparent that the objects of the invention set forth initially have been successfully achieved.

Accordingly, what is claimed is:

1. In a tool for precluding flow of fluid under pressure through a conduit means of a fluid handling system which comprises:
   (a) a housing member having a closed end and an open end adapted for connection to an outlet end of a conduit means;
   (b) a first tubular member and a second tubular member surrounding said first tubular member mounted for fluid tight longitudinal movement relative to each other and relative to the closed end of said housing member;
   (c) a pair of compression means associated respectively, with said first tubular member and said second tubular member arranged to be adjusted toward and away from each other, upon relative longitudinal movement of said members;
   (d) deformable flow-precluding means positioned between said compression means and dimensioned to permit ready insertion thereof in a conduit means when unstressed by said compression means and to effect a sealing flow precluding engagement with the walls of a surrounding conduit means when deformed radially outward by movement of said compression means towards each other;
   (e) means including an elongated member extending through said first tubular member to positively lock said first member in a conduit means to prevent its ejection therefrom by pressure; and
   (f) means to effect the relative longitudinal movement of said compression means to deform said deformable flow precluding means radially outward into fluid tight flow precluding engagement with the walls of a surrounding conduit means.

2. A tool as defined in claim 1, wherein said deformable flow precluding means comprises at least one annular compression ring member.

3. A tool as defined in claim 1, wherein said positive locking means includes a plurality of circumferentially spaced pivotally mounted and pivotally interconnected pairs of link members, the link members of each pair, when collapsed, lying longitudinally in the direction of the axis of a conduit means, and when extended have at least one link member of each pair of link members adapted to be directed at substantially right angles to said longitudinal axis and beyond the wall of a conduit means in which said deformable fluid flow precluding means is received.

4. A tool as defined in claim 3, wherein each pair of interconnected link members comprises a first link member connected to said first member and a second link member connected to said second member which is longitudinally adjustable relative to the first member to effect collapse and extension of said pairs of link members.

5. A tool member as defined in claim 4 wherein a sleeve member is associated with the first member and second member and retains said second member in adjusted position relative to said first member with one link member of each pair of link members extended at right angles to the longitudinal axis of a conduit means.

6. A tool as defined in claim 1 wherein said positive locking means includes a plurality of circumferentially spaced pivotally mounted and pivotally interconnected pairs of link members, the link members of each pair when collapsed, lying longitudinally in the direction of the axis of a conduit means, and when extended having at least one link member of each pair of link members adapted to be directed at substantially right angles to said longitudinal axis and beyond the wall of a conduit means in which said deformable fluid flow precluding means is received; the end of one of said link members, of at least one pair of said link members, that is interconnected to another link member of said pair of link members, is provided with sharp teeth which are adapted to engage the interior wall of a conduit means upon relative longitudinal movement of said first and second members to thereby secure said first member in a conduit means.

7. A tool as defined in claim 6, wherein the end of one of said link members of each pair of link members is provided with sharp teeth.

8. A tool as defined in claim 7, wherein each pair of interconnected link members comprises a first link member connected to said first member and a second link member connected to said second member which is longitudinally adjustable relative to the first member to effect collapse and extension of said pairs of link members.

9. A tool as defined in claim 8, wherein a sleeve member is associated with the first and second members and retains said second member in adjusted position relative to said first member.

10. A tool as defined in claim 1, wherein said open end of said housing is provided with coupling means to enable it to be attached to a corresponding coupling means on the downstream side of a valve which requires replacing and is attached at its upstream side to a fluid conduit means; wherein said means to effect longitudinal movement of said compression means comprises a compression tube which has a first closed end extending in fluid tight relation adjustable through the closed end of said housing and a second end; said first member comprises a backing tube having a first closed end extending in fluid tight relation adjustably through the closed end of said compression tube and a second end; said second member comprises a solid lock rod having a first end extending in fluid tight adjustable relation through the closed end of said backing tube and a second end; the second end of said backing tube is threaded and extends beyond the second end of said compression tube; a first annular compression means threaded onto the threads of said backing tube and welded to said compression tube; the second end of said lock rod extending beyond the second end of said backing tube and provided at its second end with a first ring shaped mounting member provided with a plurality of radially outwardly directed flanges; a second ring shaped mounting member threaded onto the threaded end of said backing tube provided with a plurality of radially outwardly directed flanges; a first link means having a first end pivotally connected to each of the respective flanges of the first ring shaped mounting member; a second link means having a first end pivotally connected to each of the respective flanges of the second ring shaped mounting member; the second ends of adjacent link means being pivotally interconnected; one of said second ends of each of said interconnected link means being provided with teeth; a pair of rigid annular compression rings loosely mounted on said backing tube between said compression means and said first ring shaped mounting member; a first radially expandable neoprene ring mounted between said compression means and a first of said rigid compression rings; a second radially expandable neoprene ring mounted between said rigid compression rings; the arrangement of first and second link means being such that when said lock rod is extended in a direction away from said housing member said first and second link means are collapsed and lie substantially parallel to the axis of a conduit means and when said lock rod is withdrawn in a direction toward said housing, said second link means are positioned at substantially right angles to the longitudinal axis of a conduit means and beyond the wall thereof; said teeth on said link means being adapted to securely engage the inside walls of a conduit means when said teeth are located within a conduit means and said lock rod is withdrawn toward said housing member; and sleeve means adapted to be interposed between an adjustable nut mounted on said lock rod and said backing tube to secure said link means extended at right angles to the longitudinal axis of a conduit means or the teeth in secure engagement with the inside wall of a conduit means.

References Cited

UNITED STATES PATENTS

| 2,176,260 | 10/1939 | Johnson. | |
| 2,228,241 | 1/1941 | Baker et al. | 251—191 X |
| 2,256,775 | 9/1941 | Hubbell | 138—89 |
| 2,810,401 | 10/1957 | Stansbury | 138—89 |
| 3,032,069 | 5/1962 | Ficklin | 137—315 X |
| 3,275,023 | 9/1966 | Raspante | 137—315 |

WILLIAM F. O'DEA, Primary Examiner

DAVID R. MATTHEWS, Assistant Examiner

U.S. Cl. X.R.

138—89; 251—189, 284